(12) United States Patent
Jayaraj et al.

(10) Patent No.: US 12,237,758 B2
(45) Date of Patent: Feb. 25, 2025

(54) CURRENT INFORMATION SHARING OF CONSTANT-ON-TIME POINT-OF-LOAD CONVERTERS

(71) Applicant: MAXLINEAR, INC., Carlsbad, CA (US)

(72) Inventors: Vinit Jayaraj, Santa Clara, CA (US); Omeshwar Suryakant Lawange, San Jose, CA (US); Mir Mohammad Navidi, San Jose, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 233 days.

(21) Appl. No.: 18/050,018

(22) Filed: Oct. 26, 2022

(65) Prior Publication Data

US 2023/0135595 A1 May 4, 2023

Related U.S. Application Data

(60) Provisional application No. 63/263,154, filed on Oct. 27, 2021.

(51) Int. Cl.
*H02M 3/158* (2006.01)
*H02M 1/00* (2006.01)

(52) U.S. Cl.
CPC ....... *H02M 1/0025* (2021.05); *H02M 1/0009* (2021.05); *H02M 3/158* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158;
(Continued)

(56) References Cited

U.S. PATENT DOCUMENTS 5,121,447 A 6/1992 Tanioka et al.
7,139,481 B2 * 11/2006 Furuyama ............ H04L 7/0075
398/43
(Continued)

FOREIGN PATENT DOCUMENTS

EP 3138649 B1 11/2018

OTHER PUBLICATIONS

International Search Report and Written Opinion in PCT/US2022/078742 mailed Mar. 1, 2023.

*Primary Examiner* — Jeffrey A Gblende
(74) *Attorney, Agent, or Firm* — Buchalter; Jason W. Croft (57) ABSTRACT

A multi-phase constant-on-time (COT) system includes a first point-of-load converter configured to provide a first current and a second point-of-load converter configured to provide a second current, and a bus configured to exchange information between the first point-of-load converter and the second point-of-load converter.

23 Claims, 7 Drawing Sheets

(58) Field of Classification Search
CPC ............... H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H02M 3/1586; H02M 3/285; H02M 3/33561; H02M 7/49; H02M 1/045; H02M 7/006; H02M 7/06; H02M 7/068; H02M 7/153; H02M 7/10; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/538466; H02M 7/5387; H02M 7/53871; H02M 7/53873; H02M 7/53875; H02M 1/084; H02M 1/0845; H02M 1/007; H02M 7/5395; H02M 1/14; H02M 1/0043; H02M 1/0074; H02M 1/0077; H05B 39/048; B23K 11/24; H04B 2215/069; H02J 3/46; H02J 3/38
See application file for complete search history.

(56) References Cited

U.S. PATENT DOCUMENTS

| | | | | |
|---|---|---|---|---|
| 7,908,402 | B2* | 3/2011 | Fernald | G06F 1/26 |
| | | | | 713/340 |
| 8,638,081 | B2* | 1/2014 | Heineman | H02M 3/1584 |
| | | | | 323/283 |
| 10,170,979 | B2* | 1/2019 | Baker | H02M 3/1584 |
| 11,228,248 | B1* | 1/2022 | Zafarana | H03K 5/08 |
| 2008/0239335 | A1* | 10/2008 | Lee | H04N 19/90 |
| | | | | 358/448 |
| 2010/0244802 | A1 | 9/2010 | Alexander | |
| 2013/0094416 | A1 | 4/2013 | Ling et al. | |
| 2014/0333270 | A1 | 11/2014 | Young et al. | |
| 2020/0141599 | A1 | 5/2020 | Warren et al. | |

* cited by examiner

CURRENT INFORMATION SHARING OF CONSTANT-ON-TIME POINT-OF-LOAD CONVERTERS

CROSS REFERENCE TO RELATED APPLICATIONS

This U.S. patent application claims priority to Provisional Patent Application 63/263,154 filed on Oct. 27, 2021. The disclosure of this prior application is considered part of the disclosure of this application and is hereby incorporated by reference in its entirety.

TECHNICAL FIELD

This disclosure relates to current information sharing of constant-on-time (COT) point-of-load converters (PoLs).

BACKGROUND

Unless otherwise indicated herein, the materials described herein are not prior art to the claims in the present application and are not admitted to be prior art by inclusion in this section.

Point-of-load converters (PoLs) are generally used in distributed power architectures (DPAs) to step down a relatively high power distribution bus voltage to the lower voltages needed by system components such as microprocessors, Application-Specific Integrated Circuits (ASICs), and other digital integrated circuits (ICs).

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

One aspect of the disclosure provides a method for generating an error signal. The method includes generating, by a first point-of-load converter associated to a bus, first bit stream data. The first bit stream data includes a first value that is associated with current generated by the first point-of-load converter. The method includes receiving, at the first point-of-load converter, other bit stream data from other point-of-load converters associated with the bus. Each of the other bit stream data includes a value that is associated with current generated by a corresponding point-of-load converter. The method also includes determining, by the first point-of-load converter, an average value based on the values from all of the point-of-load converter associated with the bus. The method includes generating, by the first point-of-load converter, an error signal based on a result from subtracting the first value from the average value.

Implementations of the disclosure may include one or more of the following optional features. In some implementations, the average value is determined based on a binary computation. In some implementations, the subtraction is executed based on a binary computation. In some implementations, the method includes generating, by the first point of load converter, a turn-on pulse based on the error signal. In some implementations, the method includes decoding, by the first point-of-load converter, the other bit stream data from other point of load converters associated with the bus and determining, by the first point-of-load converter, that the other bit stream data includes an address of the first point-of-load converter. In some implementations, the method includes in response to a determination that the other bit stream data includes the address of the first point of load converter, firing, by the first point-of-load converter, a turn-one signal generated based on the error signal.

Another aspect of the disclosure provides a multi-phase constant-on-time (COT) system. The system includes a first point-of-load converter configured to provide a first current, a second point-of-load converter configured to provide a second current, and a bus configured to exchange information between the first point-of-load converter and the second point-of-load converter. The information includes a first digital data from the first point-of-load converter and a second digital data from the second point-of-load converter. The first digital data includes a first value associated with the first current. The second digital data includes a second value associated with the second current.

Implementations of the disclosure may include one or more of the following optional features. In some implementations, the first point-of-load converter is configured to fire a first pulse to provide the first current, the second point-of-load converter is configured to fire a second pulse to provide the second current. The first pulse and the second pulse are fired alternately. In some implementations, the first point-of-load converter is configured to generate a first error signal based on a first difference. In some implementations, the first difference is determined based on a difference value between an average value and the first value in the first digital data. In some implementations, the average value is determined based on an average of the first value in the first digital data and the second value in the second digital data. In some implementations, the first value is associated with the first current that was provided based on a preceding first pulse, and the second value is associated with the second current that was provided based on a preceding second pulse. In some implementations, the first value is an instantaneous average current of the first current provided based on a preceding first pulse, and the second value is an instantaneous average current of the second current provided based on a preceding second pulse.

In some implementations, the first error signal is associated with a first width of the first pulse to be used when the first point-of-load converter is in its turn to fire. In some implementations, the average value is determined without converting the first value and the second value into a non-binary format. In some implementations, the average value is determined based on a binary computation. In some implementations, the first difference is determined without converting the first value and the second value into a non-binary format. In some implementations, the first difference is determined based on a binary computation.

In some implementations, the second point-of-load converter is configured to generate a second error signal based on a second difference. In some implementations, the second difference is determined based on a difference value between an average value and the second value in the second digital data. In some implementations, the average value is determined based on an average of the first value in the first digital data and the second value in the second digital data. In some implementations, the first value is associated with the first current that was provided based on a preceding first pulse, and the second value is associated with the second current that was provided based on a preceding second pulse. In some implementations, the first value is an instantaneous average current of the first current provided based on a preceding first pulse, and the second value is an instantaneous average current of the second current provided based on a preceding second pulse.

In some implementations, the second error signal is associated with a second width of the second pulse to be used when the second point-of-load converter is in its turn to fire. In some implementations, the average value is determined without converting the first value and the second value into a non-binary format. In some implementations, the average value is determined based on a binary computation. In some implementations, the second difference is determined without converting the first value and the second value into a non-binary format. In some implementations, the second difference is determined based on a binary computation. In some implementations, the first digital data includes a third value and the second digital data includes a fourth value, and the first point-of-load converter and the second point-of-load converter alternately provide the first current and the second current based on the third value and the fourth value.

INCORPORATION BY REFERENCE

All publications, patents, and patent applications mentioned in this specification are herein incorporated by reference to the same extent as if each individual publication, patent, or patent application was specifically and individually indicated to be incorporated by reference, including U.S. patent application Ser. No. 17/654,805, filed on Mar. 14, 2022, to Lawange et al.

DESCRIPTION OF DRAWINGS

Example implementations will be described and explained with additional specificity and detail through the use of the accompanying drawings in which.

Like reference symbols in the various drawings indicate like elements.

DETAILED DESCRIPTION

In some implementations, regulation in constant-on-time (COT) operation may be achieved by firing a turn-on signal (e.g., $T_{ON}$ pulse) when a voltage feedback $V_{FB}$ (associated with output voltage $V_{OUT}$) falls below an error amp output $V_C$. In some implementations, the voltage feedback $V_{FB}$ is the output voltage $V_{OUT}$. In some implementations, the voltage feedback $V_{FB}$ is a scaled down or scaled up version of the output voltage $V_{OUT}$.

In some implementations, phase interleaving of multi-phase constant-on-time (COT) needs to be executed in an asynchronous fashion. Once a point-of-load converter (PoL) #N in a multi-phase constant-on-time (COT) system has fired its turn-on signal $T_{ON}$, the next point-of-load converter (PoL) #N+1 fires the next turn-on signal $T_{ON}$. In some implementations, each of the point-of-load converters (PoLs) in the system transmits its current information (e.g., instantaneous average current $I_A$) to the other point-of-load converters (PoLs) in the system. In some implementations, each of the point-of-load converters (PoLs) in a multi-phase constant-on-time (COT) system continuously determines the average $I_{AV}$ of the instantaneous average currents $I_A$ generated by all of the point-of-load converters (PoLs) in the system. In some implementations, each of the point-of-load converters (PoLs) in a multi-phase constant-on-time (COT) system compares the average $I_{AV}$ of the instantaneous average currents $I_A$ generated by all of the point-of-load converters (PoLs) with its own instantaneous average current $I_{An}$, and creates an error signal $V_{CSn}$ based on a difference between the average of all of instantaneous average current $I_A$ generated by all of the point-of-load converters (PoLs) and its own instantaneous average current $I_{An}$. For example, when a point-of load converter (PoL) #N+1 is ready to fire its turn-on signal $T_{ON(N+1)}$, it has already computed or adjusted its turn-on signal $T_{ON(N+1)}$ based on the error signal $V_{CS(N+1)}$. In some implementations, the turn-on signal $T_{ON}$ is adjusted based on one or more factors: an output voltage $V_{OUT}$, an input voltage $V_{IN}$, and the error signal $V_{CS}$.

The present disclosure provides several implementations of multi-phase constant-on-time (COT) system that may be more robust and efficient (e.g., reducing time delay created for adjusting the turn-on signal $T_{ON}$, utilizing single line (bit line) for sharing current information) for various applications. For example, two or more point-of-load converters (PoLs) can be used to create a multi-phase constant-on-time (COT) system.

Figure 1:
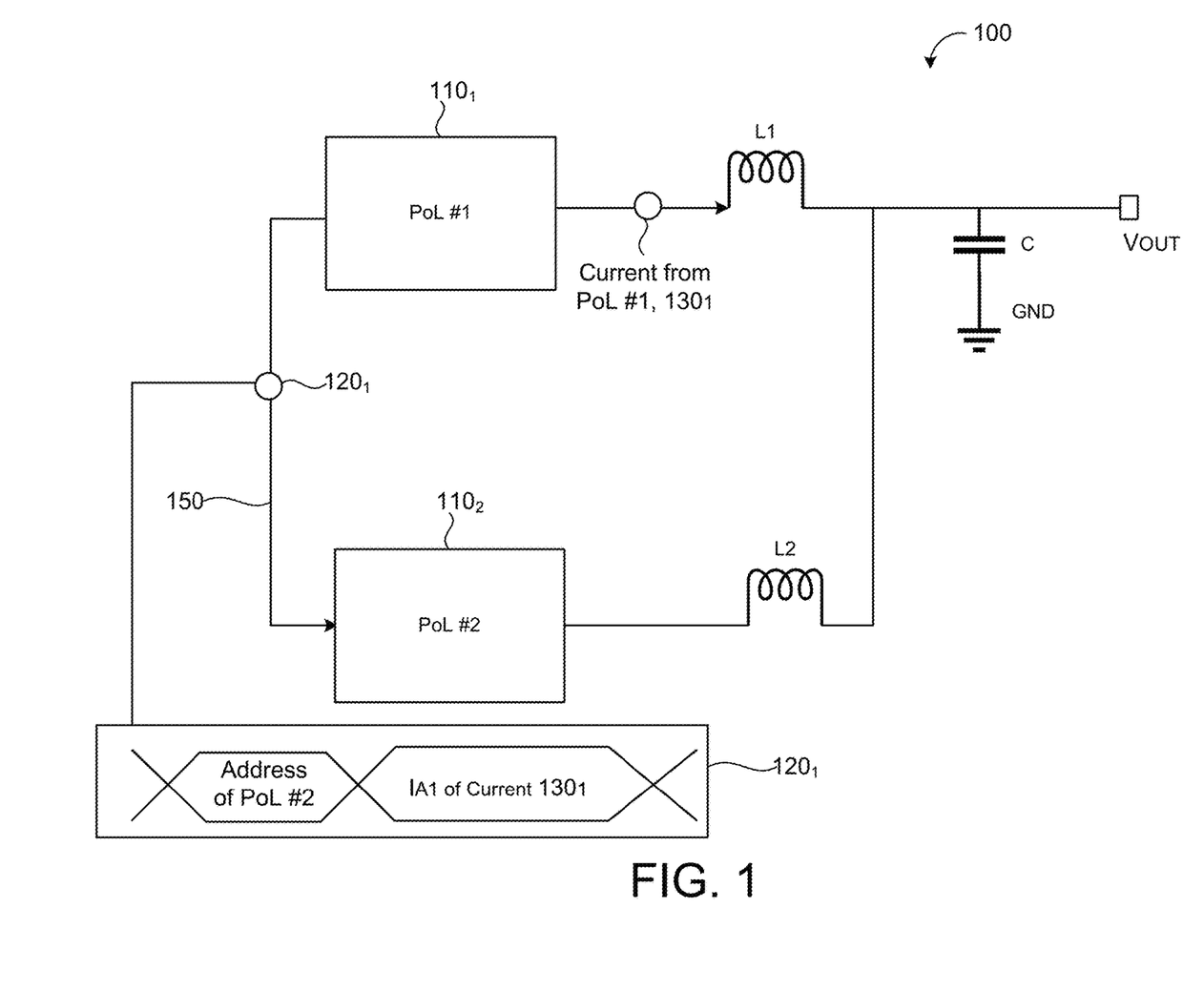
FIGS. 1 and 2 are schematic views of an example multi-phase constant-on-time (COT) system configured with two point-of-load converters (PoLs) in accordance with some implementations of this disclosure.
Figure 2:
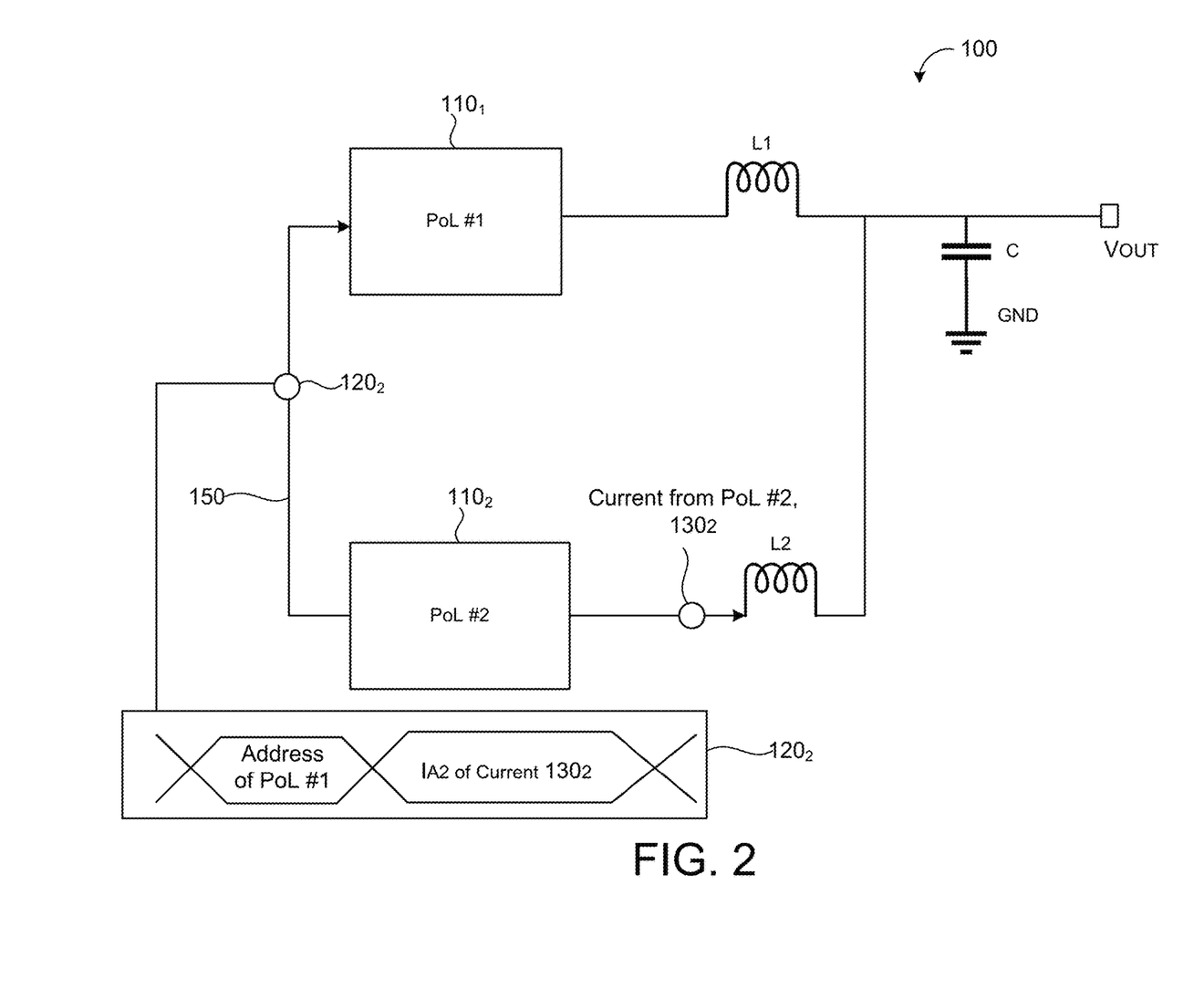

FIGS. 1 and 2 are schematic views of an example multi-phase constant-on-time (COT) system 100 configured with two point-of-load converters (PoLs) 110 in accordance with some implementations of this disclosure.

As shown in FIGS. 1 and 2, the example multi-phase constant-on-time (COT) system 100 includes two point-of-load converters (PoLs) 110$_1$, 110$_2$ (collectively PoLs 110) that are configured to provide current alternately (e.g., taking turns, taking a rotation) when a voltage feedback $V_{FB}$ (associated with output voltage $V_{OUT}$) falls below an error amp output $V_C$.

FIG. 1 illustrated the operations of system 100 when the point-of-load converter (PoL) #1 110$_1$ is in its turn (e.g., phase). As shown in FIG. 1, in some implementations, the point-of-load converter (PoL) #1 110$_1$ is configured to provide current 130$_1$ in its turn using its turn-on signal $T_{ON1}$. As shown, in some implementations, the point-of-load converter (PoL) #1 110$_1$ is also configured to share its current information 120$_1$ (with respect to current 130$_1$ it provides in its turn) to other point-of-load converters (PoLs) 110 (PoL #2 110$_2$ in this example) in the system 100 in its turn via a signal line 150 (e.g., bus). As shown, in some implementations, the current information 120$_1$ includes a value the current 130$_1$ or a value associated with the current 130$_1$ (e.g., instantaneous average current $I_{A1}$ based on the current 130$_1$). In some implementations, the current information 120 includes an indicator (e.g., address of PoL 110 for the next turn) that specifies which point-of-load converter (PoL) 110 is responsible for the next turn. For example, as shown, the current information 120$_1$ includes an address of PoL #2 110$_2$ as an indicator which specifies that the point-of-load converter (PoL) #2 $110_2$ is responsible for the next turn. As shown, in some implementations, the current information $120_1$ is in a digital format (e.g., bit stream, digital signal).

As shown, in some implementation, one point-of-load converters (PoLs) 110 (PoL #1 $110_1$ in the example in FIG. 1) is able to share the current information 120 with other point-of-load converters (PoLs) 110 in its turn, and all other point-of-load converters (PoLs) 110 (that are waiting for its own turn) (PoL #2 $110_2$ in the example in FIG. 1) receive the current information 120.

In some implementations, the point-of-load converter (PoL) #2 $110_2$ in the system 100 continuously determines the average $I_{AV}$ of the instantaneous average currents $I_A$ generated by all of the point-of-load converters (PoLs) 110 in the system 100. In some implementations, the point-of-load converter (PoL) #2 $110_2$ compares the average $I_{AV}$ of the instantaneous average currents $I_A$ generated by all of the point-of-load converters (PoLs) 110 with its own instantaneous average current $I_{A2}$ (based on current $130_2$ generated by the PoL #2 $110_2$ when the PoL #2 was in its turn last time) and creates an error signal $V_{CS2}$ based on a difference between the average of all of instantaneous average current $I_A$ generated by all of the point-of-load converters (PoLs) 110 and its own instantaneous average current $I_{A2}$. When the point-of load converter (PoL) #2 $110_2$ is ready to fire its turn-on signal $T_{ON2}$ to supply the current $130_2$, it has already computed or adjusted its turn-on signal $T_{ON2}$ for the point-of-load converter (PoL) #2 $110_2$ based on the error signal $V_{CS2}$. In some implementations, the turn-on signal $T_{ON2}$ for the point-of-load converter (PoL) #2 $110_2$ is adjusted based on one or more factors: output voltage $V_{OUT}$, input voltage $V_{IN}$, and error signal $V_{CS2}$.

FIG. 2 illustrated the operations of system 100 when the point-of-load converter (PoL) #2 $110_2$ is in its turn (e.g., phase). As shown in FIG. 2, in some implementations, the point-of-load converter (PoL) #2 $110_2$ is configured to provide current $130_2$ in its turn using its turn-on signal $T_{ON2}$ (adjusted based on one or more factors: output voltage $V_{OUT}$, input voltage $V_{IN}$, and error signal $V_{CS2}$). As shown, in some implementations, the point-of-load converter (PoL) #2 $110_2$ is also configured to share current information $120_2$ (with respect to current $130_2$ it provides in its turn) to other point-of-load converters (PoLs) 110 (PoL #1 $110_1$ in this example) in the system 100 in its turn via the signal line 150 (e.g., bus). As shown, in some implementations, the current information $120_2$ includes a value of the current $130_2$ or a value associated with the current $130_2$ (e.g., instantaneous average current $I_{A2}$ based on the current $130_2$). As discussed, in some implementations, the current information 120 includes an indicator (e.g., address of PoL 110 for the next turn) that specifies which point-of-load converter (PoL) 110 is responsible for the next turn. For example, as shown, the current information $120_2$ includes an address of PoL #1 $110_1$ as an indicator which specifies that the point-of-load converter (PoL) #1 $110_1$ is responsible for the next turn. As shown, in some implementations, the current information $120_2$ is in a digital format (e.g., bit stream, digital signal).

As shown, in some implementation, one point-of-load converters (PoLs) 110 (PoL #2 $110_2$ in the example in FIG. 2) is able to share the current information 120 with other point-of-load converters (PoLs) 110 in its turn, and all other point-of-load converters (PoLs) 110 (that are waiting for its own turn) (PoL #1 $110_1$ in the example in FIG. 1) receive the current information 120.

In some implementations, the point-of-load converter (PoL) #1 $110_1$ in the system 100 continuously determines the average $I_{AV}$ of the instantaneous average currents $I_A$ generated by all of the point-of-load converters (PoLs) 110 in the system 100. In some implementations, the point-of-load converter (PoL) #1 $110_1$ compares the average $I_{AV}$ of the instantaneous average currents $I_A$ generated by all of the point-of-load converters (PoLs) 110 with its own instantaneous average current $I_{A1}$ (based on current $130_1$ in FIG. 1) and creates an error signal $V_{CS1}$ based on a difference between the average of all of instantaneous average current $I_A$ generated by all of the point-of-load converters (PoLs) 110 and its own instantaneous average current $I_{A1}$. When the point-of load converter (PoL) #1 $110_1$ is ready to fire its turn-on signal $T_{ON1}$ to supply the current $130_1$, it has already computed or adjusted its turn-on signal $T_{ON1}$ for the point-of-load converter (PoL) #1 $110_1$ based on the error signal $V_{CS1}$. In some implementations, the turn-on signal $T_{ON1}$ for the point-of-load converter (PoL) #1 $110_1$ is adjusted based on one or more factors: output voltage $V_{OUT}$, input voltage $V_{IN}$, and error signal $V_{CS1}$.

Figure 3:
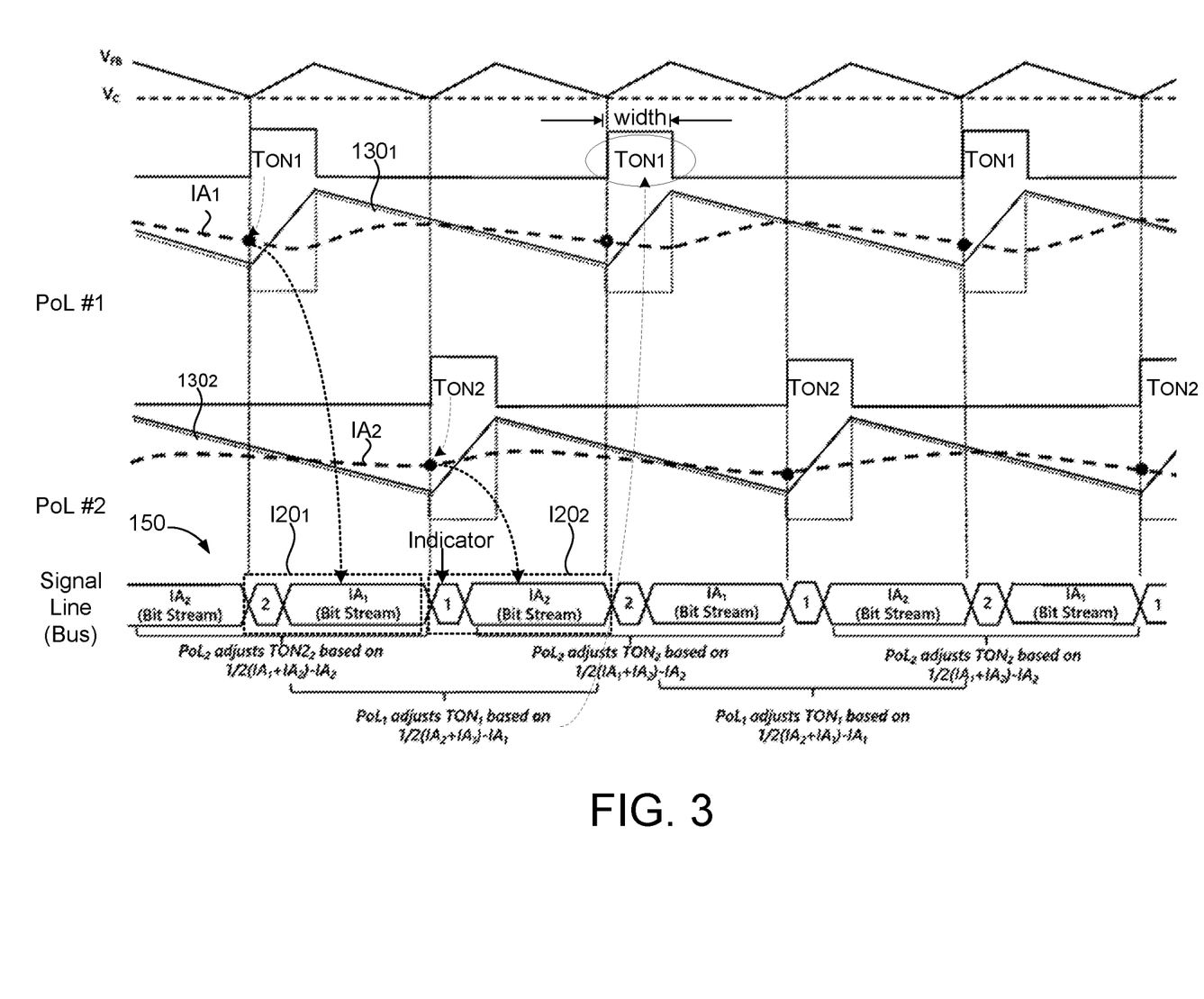
FIG. 3 includes a timing diagram to illustrate the operations of adjusting the turn-on signal for the point-of-load converter (PoL) #1 in accordance with some implementations of this disclosure.
Figure 4:
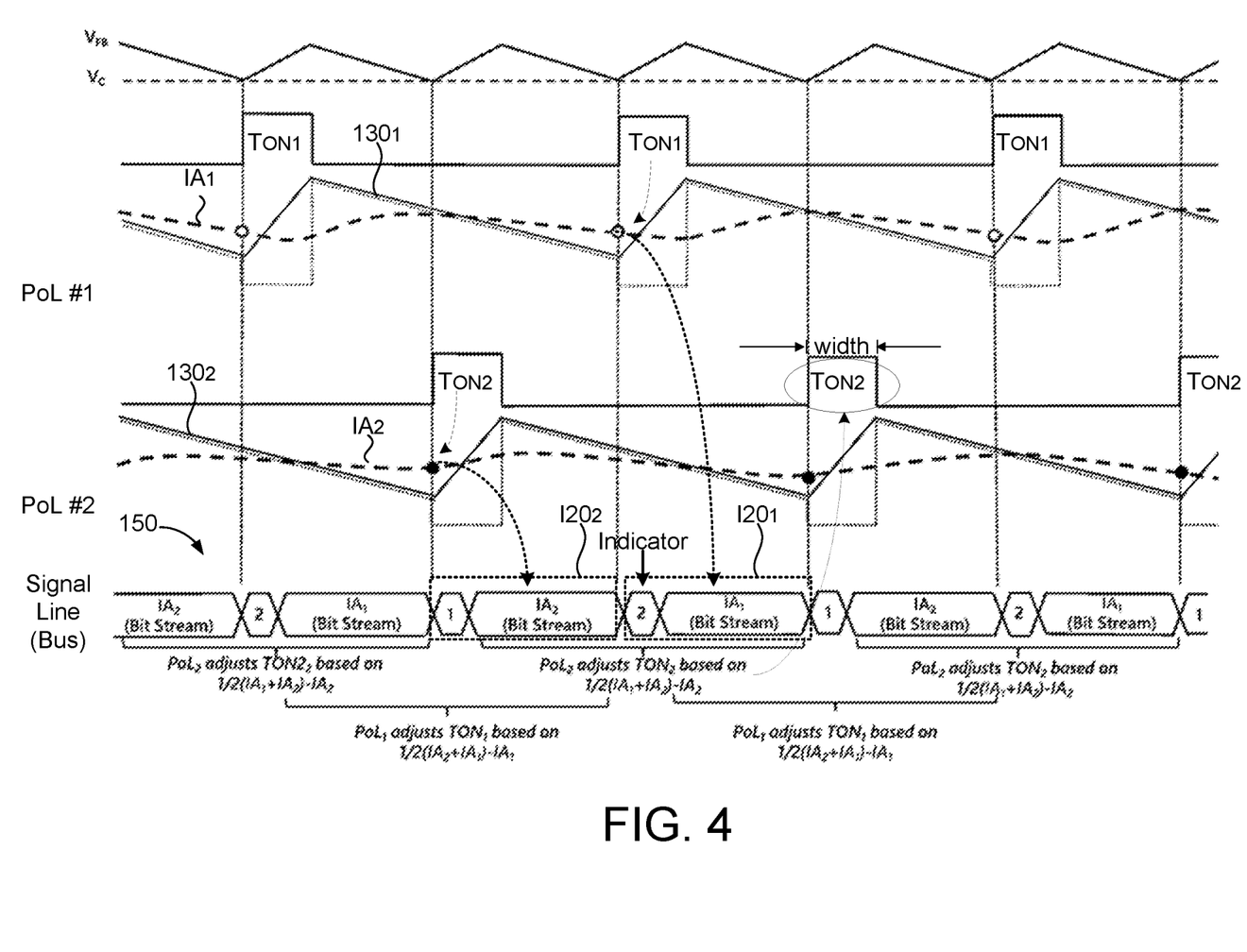
FIG. 4 includes a timing diagram to illustrate the operations of adjusting the turn-on signal for the point-of-load converter (PoL) #2 in accordance with some implementations of this disclosure.

FIG. 3 includes a timing diagram 300 to illustrate the operations of adjusting the turn-on signal $T_{ON1}$ (e.g., adjusting the width of $T_{ON1}$ pulse) for the point-of-load converter (PoL) #1 $110_1$ in accordance with some implementations of this disclosure. FIG. 4 includes a timing diagram 400 to illustrate the operations of adjusting the turn-on signal $T_{ON2}$ (e.g., adjusting the width of $T_{ON2}$ pulse) for the point-of-load converter (PoL) #2 $110_2$ in accordance with some implementations of this disclosure.

As discussed, in some implementations, each of the point-of-load converters (PoLs) 110 needs the average of all of instantaneous average current $I_A$ generated by all of the point-of-load converters (PoLs) 110 and its own instantaneous average current $I_A$ (which was generated in its turn last time) to generate an error signal $V_C$ that is used to adjust the its turn-on signal $T_{ON}$ for its upcoming turn. As discussed, based the difference between the average of all of instantaneous average current $I_A$ generated by all of the point-of-load converters (PoLs) 110 and its own instantaneous average current $I_A$, each of the point-of-load converters (PoLs) 100 (waiting for its upcoming turn) is able to determine the width of turn-on signal $T_{ON}$ for its upcoming turn. For example, when the current average of all of instantaneous average current $I_A$ generated by all of the point-of-load converters (PoLs) 110 is greater than its own instantaneous average current $I_{An}$, the point-of-load converter (PoL) $110n$ increases the width of its turn-on signal $T_{ONn}$, for its upcoming turn so that the point-of-load converter (PoL) $110n$ supplies more current that match with the current average of all of instantaneous average current $I_A$ generated by all of the point-of-load converters (PoLs) 110. Also, the current average of all of instantaneous average current $I_A$ generated by all of the point-of-load converters (PoLs) 110 is less than its own instantaneous average current $I_{An}$, the point-of-load converter (PoL) $110n$ decreases the width of its turn-on signal $T_{ONn}$, for its next turn so that the point-of-load converter (PoL) $110n$ supplies less current that match with the current average of all of instantaneous average current $I_A$ generated by all of the point-of-load converters (PoLs) 110. As discussed, in some implementations, the width of $T_{ONn}$ is adjusted by adjusting the error signal $V_{CSn}$.

As shown, in some implementations, each of the point-of-load converters (PoLs) 110 (PoL #1 $110_1$ and PoL #2 $110_2$ in this example) in the system 100 is configured to transmit its current information $120n$ in a digital signal format (e.g., bit stream) to other point-of-load converters (PoLs) 110 via the signal line 150 (e.g., bus). In some implementations, the instantaneous average current $I_{An}$ in the current information $120n$ is in a digital signal format (e.g., bit stream). In some implementations, the indicator (e.g., address of the PoL $110n$ responsible for the next turn) in the current information $120n$ is a digital signal format.

In some implementations, each of the point-of-load converters (PoLs) 110 (PoL #1 $110_1$ and PoL #2 $110_2$ in this example) in the system 100 is configured to continuously receive the current information $120n$ (e.g., indicator, instantaneous average current $I_{An}$) in the digital signal format (e.g., bit stream). In some implementations, each of the point-of-load converters (PoLs) 110 (PoL #1 $110_1$ and PoL #2 $110_2$ in this example) in the system 100 continuously determines the average $I_{AV}$ of the instantaneous average currents $I_A$ generated by all of the point-of-load converters (PoLs) 110 (PoL #1 $110_1$ and PoL #2 $110_2$ in this example) in the system 100 based on the current information $120n$ in the digital signal format. In some implementations, the determined average $I_{AV}$ of the instantaneous average currents $I_A$ is in the digital signal format (e.g., bit stream). In some implementations, during the determining the instantaneous average currents $I_A$ (generated by all of the point-of-load converters (PoLs) 110) step, the current information $120n$ (e.g., instantaneous average current $I_{An}$) in the digital signal format is used without changing/converting into words.

In some implementations, each of the point-of-load converters (PoLs) 110 (PoL #1 $110_1$ and PoL #2 $110_2$ in this example) in the system 100 compares the average $I_{AV}$ of the instantaneous average currents $I_A$ (generated by all of the point-of-load converters (PoLs) 110) that is in the digital format (e.g., bit stream) with its own instantaneous average current $I_{An}$ that is also in the digital signal format (e.g., bit stream). In some implementations, in the comparison step, a difference between the average $I_{AV}$ of the instantaneous average currents $I_A$ (generated by all of the point-of-load converters (PoLs) 110) that is in the digital format (e.g., bit stream) and its own instantaneous average current $I_{An}$ in the digital signal format (e.g., bit stream) is determined without changing/converting the digital signals (e.g., average current $I_{An}$ in the digital signal format, instantaneous average current $I_{An}$ in the digital signal format) into words. As discussed, in some implementations, based on the difference, the error signal $V_{CSn}$ is generate to adjust the turn-on signal $T_{ONn}$. In other words, in some implementations, computation (e.g., determining average, subtraction) of the digital signals is executed in real time without converting the digital signals into words during the computation/determination steps.

As shown in FIGS. 3 and 4, as results, the width of the turn-on signal $T_{ON1}$ (or error signal $V_{CS1}$ associated with the width of the turn-on signal $T_{ON1}$) is determined based on the instantaneous average currents $I_{A1}$ and instantaneous average currents $I_{A2}$ using the real time (high frequency) bit stream computation (e.g., determining average, subtraction). Similar, the width of the turn-on signal $T_{ON2}$ (or error signal $V_{CS2}$ associated with the width of the turn-on signal $T_{ON2}$) is determined based on the instantaneous average currents $I_{A2}$ and instantaneous average currents $I_{A1}$ using the real time (high frequency) bit stream computation (e.g., determining average, subtraction).

Figure 5:
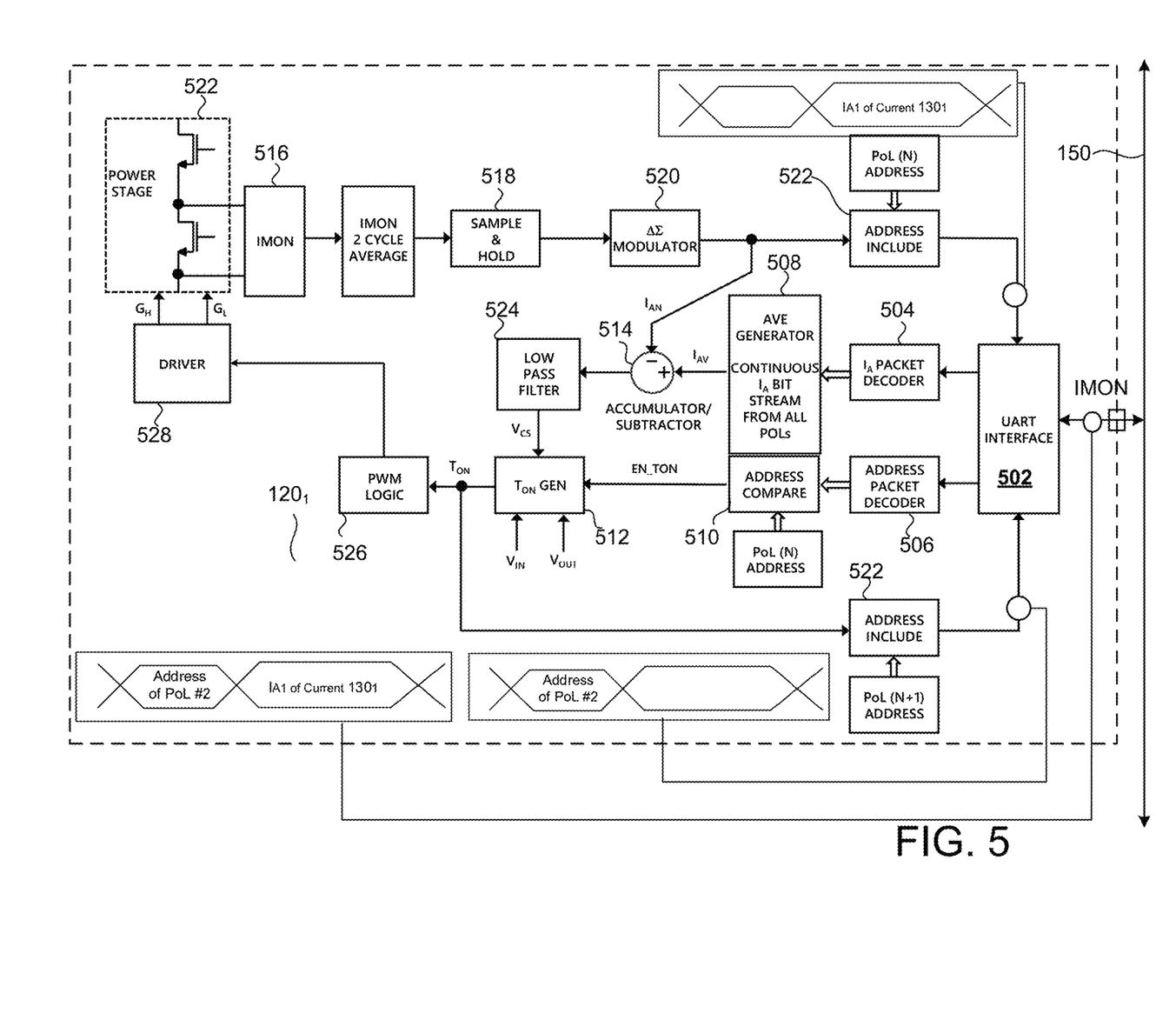
FIG. 5 is an example integrated circuit (IC) functional block diagram of the point-of-load converter (PoL) #1 in accordance with some implementations of this disclosure.

FIG. 5 is an example integrated circuit (IC) functional block diagram of the point-of-load converter (PoL) $110_1$ in accordance with some implementations of this disclosure.

As shown, in some implementations, the point-of-load-converter (PoL) #1 $110_1$ includes a universal asynchronous receiver-transmitter (UART) interface 502 that is configured to receive the current information 120 from all of the point-of-load converters (PoLs) 110 in the system 100 via the signal line 150 (e.g., bus) and to transmit its current information $120_1$ to other point-of-load converters (PoLs) 110 in the system 100 via the signal line 150 (e.g., bus). In some implementations, the instantaneous average currents $I_A$ portion (e.g., pockets) of each current information 120 (from all of the PoLs 110 in the system 100 including the PoL #1 $110_1$) are decoded by an instantaneous average current packet decoder 504 and an indicator portion (e.g., address of POL for the next turn) of each current information 120 is decoded by an address packet decoder 506.

In some implementations, the decoded instantaneous average currents $I_A$ from all of the point-of-load-converter (PoL) 110 in the system 100 are sent to an instantaneous average current average generator (circuit) unit 508 to determine an average $I_{AV}$ of the instantaneous average currents $I_A$ (generated by all of the point-of-load converters (PoLs) 110).

In some implementations, the point-of-load-converter (PoL) #1 $110_1$ includes point-of-load converter (PoL) address comparison (circuit) unit 510 which is configured to compare the decoded point-of-load converter (PoL) address in each current information 120 with own address. When the decoded point-of-load converter (PoL) address in the current information 120 is matched with own address, the comparison (circuit) unit 510 transmit an enable signal EN_TON to a turn-on signal generator (circuit) 512 configured to generate the turn-on signal $T_{ON1}$ based on the error signal $V_{CS1}$, input voltage $V_{IN}$, output voltage $V_{OUT}$.

In some implementations, the point-of-load-converter (PoL) #1 $110_1$ includes the instantaneous average current average generator (circuit) unit 508 configured to (continuously) determine an average $I_{AV}$ of the instantaneous average currents $I_A$ (generated by all of the point-of-load converters (PoLs) 110) that is in the digital format (e.g., bit stream). In some implementations, the instantaneous average current average generator (circuit) unit 508 transmits the average $I_{AV}$ of the instantaneous average currents $I_A$ (generated by all of the point-of-load converters (PoLs) 110) to an accumulator/subtractor (circuit) unit 514.

In some implementations, the point-of-load-converter (PoL) #1 $110_1$ includes a current monitoring (circuit) unit 516, a sample & hold (circuit) unit 518, and modulator (circuit) unit 520 to sense/measure the current $130_1$ provided by a power stage 522 and to generate the instantaneous average current $I_{A1}$ in the digital signal format (e.g., bit stream) based on the measurement of the current $130_1$. In some implementations, the modulator (circuit) unit 520 is configured to transmit the instantaneous average current $I_{A1}$ in the digital signal format (e.g., bit stream) to the accumulator/subtractor (circuit) unit 514 and an PoL address attachment (circuit) unit 522. In some implementations, at the PoL address attachment (circuit) unit 522, an address of the point-of-load-converter (PoL) #1 $110_1$ is attached to the instantaneous average current $I_{A1}$ in the digital signal format (e.g., bit stream) so other point-of-load-converters (PoLs) including itself can use the instantaneous average current $I_{A1}$ when determining the average $I_{AV}$ of the instantaneous average currents $I_A$ (generated by all of the point-of-load converters (PoLs) 110).

In some implementations, the point-of-load-converter (PoL) #1 $110_1$ includes the accumulator/subtractor (circuit) unit 514 configured to (continuously) determine a difference between the average $I_{AV}$ of the instantaneous average currents $I_A$ (generated by all of the point-of-load converters (PoLs) 110) that is in the digital format (e.g., bit stream) and its own instantaneous average current $I_{A1}$ in the digital signal format (e.g., bit stream).

In some implementations, the point-of-load-converter (PoL) #1 $110_1$ includes a low pass filter (circuit) unit 524 configured to generate an error signal $V_{CS1}$ based on the determined difference. As discussed, the error signal $V_{CS1}$ is used to adjust the width of the turn-on signal $T_{ON1}$.

In some implementations, the point-of-load-converter (PoL) #1 $110_1$ includes the turn-on signal generator (circuit) 512 configured to generate the turn-on signal $T_{ON1}$ based on the error signal $V_{CS1}$, input voltage $V_{IN}$, output voltage $V_{OUT}$.

In some implementations, the point-of-load-converter (PoL) #1 $110_1$ includes a pulse width modulation (PWM) logic (circuit) unit 526 configured to generate and transmit a control signal to a driver (circuit) unit 528. In some implementations, the driver (circuit) unit 528 is configured to drive a power stage 522 that provides the current $130_1$.

In some implementations, the point-of-load-converter (PoL) #1 $110_1$ includes an indicator generator (circuit) unit 530 configured to generate an indicator (e.g., address of PoL for the next turn).

In some implementations, at the universal asynchronous receiver-transmitter (UART) interface 502, the instantaneous average current $I_{A1}$ (with PoL #1 address) in the digital signal format (e.g., bit stream) and the indicator generated by the indicator generator (circuit) unit 530 are combined as the current information $120_1$. As discussed the current information $120_1$ is shared with other the point-of-load-converters (PoLs) 110 in the system 100 via the signal line 150 (e.g. bus).

Figure 6:
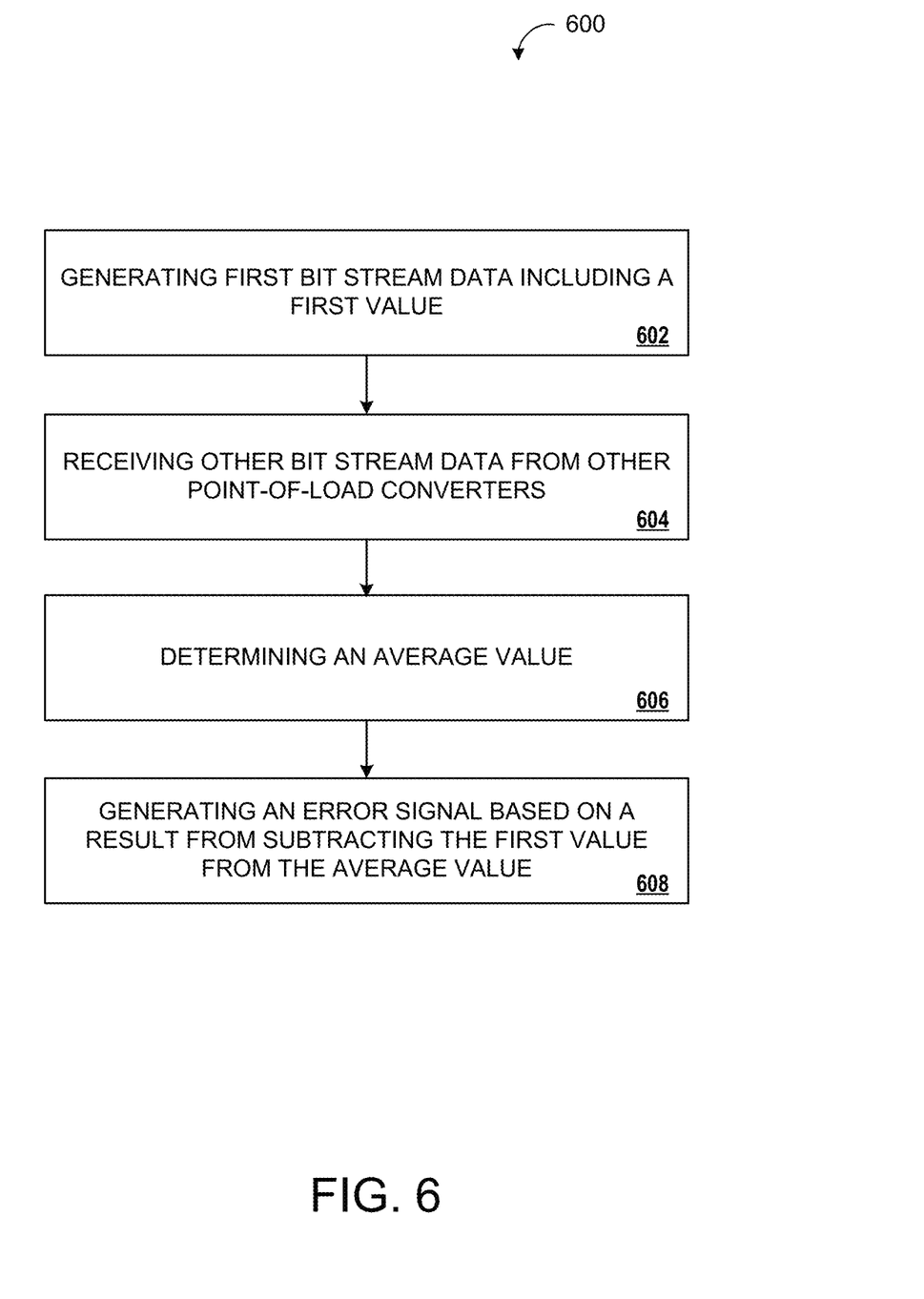
FIG. 6 is a flowchart of an example arrangement of operations for a method of generating an error signal.

FIG. 6 is a flowchart of an example arrangement of operations for a method 600 of generating an error signal $V_{CS}$. The method 700 may be performed by processing logic that may include hardware (circuitry, dedicated logic, etc.), software (such as is run on a general purpose computer system or a dedicated machine), or a combination of both, which processing logic may be included in any computer system or device. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As discussed above, in some implementations, a point-of-load converter (PoL) 110 is configured to generate an error signal $V_{CS}$ that is used to generate its next turn-on signal $T_{ON}$. In some implementations, when the point-of-load converter (PoL) determines that its last current output (e.g., instantaneous average current $I_A$) is less than an average $I_{AV}$ of currents (e.g., instantaneous average currents $I_A$) generated by all of point-of-load converters (PoLs), the point-of-load (PoL) generates the error signal $V_{CS}$ that increases the width of the its next turn-on signal $T_{ON}$. In some implementations, when the point-of-load converter (PoL) determines that its last current output (e.g., instantaneous average current $I_A$) is more than the average $I_{AV}$ of currents (e.g., instantaneous average currents $I_A$) generated by all of point-of-load converters (PoLs), the point-of-load (PoL) generates the error signal $V_{CS}$ that decreases the width of the its next turn-on signal $T_{ON}$.

The method 600, at operation 602, includes generating, by a first point-of-load converter associated to a bus, first bit stream data. The first bit stream data includes a first value that is associated with current generated by the first point-of-load converter.

The method 600, at operation 604, includes receiving, at the first point-of-load converter, other bit stream data from other point-of-load converters associated with the bus. Each of the other bit stream data includes a value that is associated with current generated by a corresponding point-of-load converter.

The method 600, at operation 606, includes determining, by the first point-of-load converter, an average value (bit stream data) based on the values from all of the point-of-load converter associated with the bus.

The method 600, at operation 608, includes generating, by the first point-of-load converter, an error signal based on a result from subtracting the first value (bit stream data) from the average value (bit stream data).

To reduce the processing time, in some implementations, the average value is determined based on a binary computation (e.g., computation of (high frequency) bit stream data in real time). Similarly, in some implementations, the subtraction is executed based on a binary computation (e.g., computation of (high frequency) bit stream data in real time).

Figure 7:
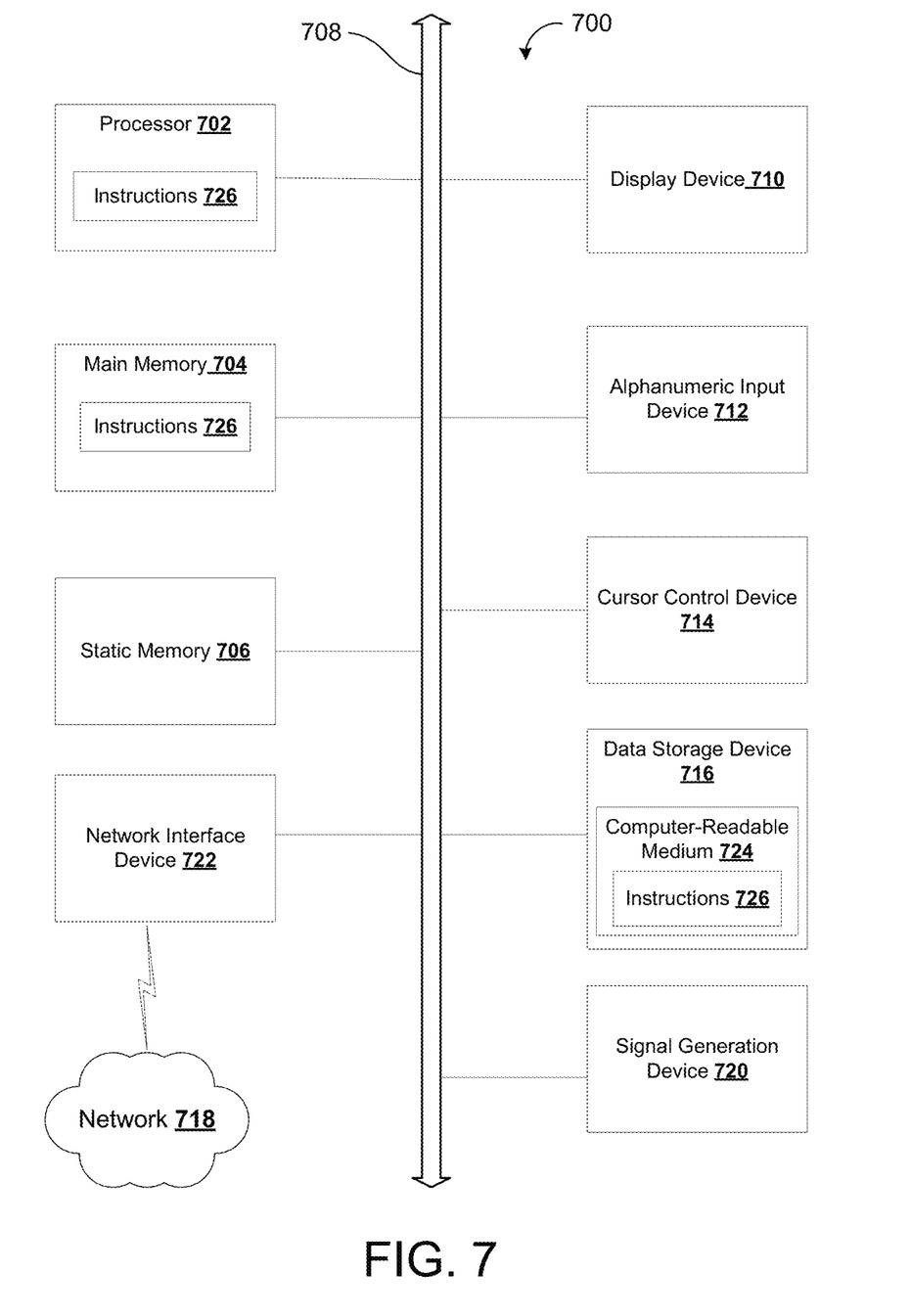
FIG. 7 is a schematic view illustrating a machine in the example form of a computing device.

FIG. 7 is a schematic view illustrating a machine in the example form of a computing device 700.

As discussed, point-of-load converters (PoLs) are generally used in distributed power architectures (DPAs) to step down a relatively high power distribution bus voltage to the lower voltages needed by system components such as microprocessors, Application-Specific Integrated Circuits (ASICs), and other digital integrated circuits (ICs). For example, the multi-phase constant-on-time (COT) system 100 can be used to provide voltage to the computing device 700 or components in the computing device 700 (e.g., processor 702). For instance, a component such as the processor 702 receives voltage provided by the multi-phase constant-on-time (COT) system 100 and provides an instruction to the multi-phase constant-on-time (COT) system 100 to increase or decrease the voltage when necessary.

The computing device 700 may include a mobile phone, a smart phone, a netbook computer, a rackmount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative implementations, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 716, which communicate with each other via a bus 708.

Processing device 702 represents one or more general-purpose processing devices such as a microprocessor, central processing unit, or the like. More particularly, the processing device 702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also include one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computing device 700 may further include a network interface device 722 which may communicate with a network 718. The computing device 700 also may include a display device 710 (e.g., a liquid crystal display (LCD) or a cathode ray tube (CRT)), an alphanumeric input device 712 (e.g., a keyboard), a cursor control device 714 (e.g., a mouse) and a signal generation device 720 (e.g., a speaker). In at least one implementation, the display device 710, the alphanumeric input device 712, and the cursor control device 714 may be combined into a single component or device (e.g., an LCD touch screen).

The data storage device 716 may include a computer-readable storage medium 724 on which is stored one or more sets of instructions 726 embodying any one or more of the methods or functions described herein. The instructions 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 718 via the network interface device 722.

While the computer-readable storage medium 726 is shown in an example implementation to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

A number of implementations have been described. Nevertheless, it will be understood that various modifications may be made without departing from the spirit and scope of the disclosure. Accordingly, other implementations are within the scope of the following claims.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A multi-phase constant-on-time (COT) system, the system comprising:
   a first point-of-load converter configured to provide a first current;
   a second point-of-load converter configured to provide a second current; and
   a bus configured to exchange information between the first point-of-load converter and the second point-of-load converter,
   wherein the information includes a first digital data from the first point-of-load converter and a second digital data from the second point-of-load converter, the first digital data including a first value associated with the first current, the second digital data including a second value associated with the second current,
   wherein the first digital data includes a third value and the second digital data includes a fourth value, and
   wherein the first point-of-load converter and the second point-of-load converter alternately provide the first current and the second current based on the third value and the fourth value.

2. The system of claim 1,
   wherein the first point-of-load converter is configured to fire a first pulse to provide the first current,
   wherein the second point-of-load converter is configured to fire a second pulse to provide the second current, and
   wherein the first pulse and the second pulse are fired alternately.

3. The system of claim 2, wherein the first point-of-load converter is configured to generate a first error signal based on a first difference, the first difference determined based on a difference value between an average value and the first value in the first digital data, the average value determined based on an average of the first value in the first digital data and the second value in the second digital data.

4. The system of claim 3,
   wherein the first value is associated with the first current that was provided based on a preceding first pulse, and
   wherein the second value is associated with the second current that was provided based on a preceding second pulse.

5. The system of claim 3,
   wherein the first value is an instantaneous average current of the first current provided based on a preceding first pulse, and
   wherein the second value is an instantaneous average current of the second current provided based on a preceding second pulse.

6. The system of claim 3, wherein the first error signal is associated with a first width of the first pulse to be used when the first point-of-load converter is in a turn to fire the first pulse.

7. The system of claim 3, wherein the average value is determined without converting the first value and the second value into a non-binary format.

8. The system of claim 3, wherein the average value is determined based on a binary computation.

9. The system of claim 3, wherein the first difference is determined without converting the first value and the second value into a non-binary format.

10. The system of claim 3, wherein the first difference is determined based on a binary computation.

11. The system of claim 2, wherein the second point-of-load converter is configured to generate a second error signal based on a second difference, the second difference determined based on a difference value between an average value and the second value in the second digital data, the average value determined based on an average of the first value in the first digital data and the second value in the second digital data.

12. The system of claim 11,
    wherein the first value is associated with the first current that was provided based on a preceding first pulse, and
    wherein the second value is associated with the second current that was provided based on a preceding second pulse.

13. The system of claim 12,
    wherein the first value is an instantaneous average current of the first current provided based on a preceding first pulse, and
    wherein the second value is an instantaneous average current of the second current provided based on a preceding second pulse.

14. The system of claim 11, wherein the second error signal is associated with a second width of the second pulse to be used when the second point-of-load converter is in its turn to fire.

15. The system of claim 11, wherein the average value is determined without converting the first value and the second value into a non-binary format.

16. The system of claim 11, wherein the average value is determined based on a binary computation.

17. The system of claim 11, wherein the second difference is determined without converting the first value and the second value into a non-binary format.

18. The system of claim 11, wherein the second difference is determined based on a binary computation.

19. A method, comprising:
    generating, by a first point-of-load converter associated to a bus, first bit stream data, the first bit stream data including a first value that is associated with current generated by the first point-of-load converter;
    receiving, at the first point-of-load converter, other bit stream data from other point-of-load converters associated with the bus, each of the other bit stream data including a value that is associated with current generated by a corresponding point-of-load converter;
    determining, by the first point-of-load converter, an average value based on the values from all of the point-of-load converter associated with the bus;
    generating, by the first point-of-load converter, an error signal based on a result from subtracting the first value from the average value;
    decoding, by the first point-of-load converter, the other bit stream data from other point of load converters associated with the bus; and
    determining, by the first point-of-load converter, that the other bit stream data includes an address of the first point-of-load converter.

20. The method of claim 19, wherein the average value is determined based on a binary computation.

21. The method of claim 19, wherein the subtraction is executed based on a binary computation.

22. The method of claim 19, the method further comprising: generating, by the first point of load converter, a turn-on pulse based on the error signal.

23. The method of claim 19, the method further comprising:
   in response to a determination that the other bit stream data includes the address of the first point of load converter, firing, by the first point-of-load converter, a turn-one signal generated based on the error signal.

* * * * *